United States Patent
Lee et al.

(10) Patent No.: US 10,820,086 B2
(45) Date of Patent: Oct. 27, 2020

(54) AUDIO EYEGLASSES WITH GESTURE CONTROL

(71) Applicant: Bose Corporation, Framingham, MA (US)

(72) Inventors: Vincent James Lee, San Francisco, CA (US); Kapil Krishnamurthy, Newark, CA (US); Pavan Savoy, Union City, CA (US); Mehul Amrit Trivedi, Oakland, CA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/992,982

(22) Filed: May 30, 2018

(65) Prior Publication Data

US 2019/0373355 A1    Dec. 5, 2019

(51) Int. Cl.
*H04R 1/10* (2006.01)
*G02C 11/00* (2006.01)
*G06F 3/01* (2006.01)

(52) U.S. Cl.
CPC ........... *H04R 1/1041* (2013.01); *G02C 11/10* (2013.01); *G06F 3/017* (2013.01)

(58) Field of Classification Search
CPC ... G06F 1/3231; G06F 1/325; H04R 2460/03; Y02D 10/173; Y02D 70/26
See application file for complete search history.

(56) References Cited

U.S. PATENT DOCUMENTS

| 8,320,578 | B2* | 11/2012 | Kahn | H04M 1/6066 |
| | | | | 381/123 |
| 9,009,516 | B1* | 4/2015 | Gabayan | G06F 1/3206 |
| | | | | 713/323 |
| 9,794,676 | B2 | 10/2017 | Shetye et al. | |
| 9,808,185 | B2* | 11/2017 | Arnold | A61B 5/1123 |
| 10,397,681 | B2 | 8/2019 | Silver et al. | |
| D864,283 | S | 10/2019 | Williams et al. | |
| 10,555,071 | B2 | 2/2020 | Wakeland et al. | |
| 2002/0135474 | A1* | 9/2002 | Sylliassen | G06F 1/3203 |
| | | | | 340/540 |
| 2010/0177277 | A1* | 7/2010 | Kokonaski | G02C 7/083 |
| | | | | 351/159.39 |
| 2017/0045928 | A1 | 2/2017 | Ishikawa et al. | |
| 2017/0199560 | A1 | 7/2017 | Milford | |
| 2018/0011530 | A1* | 1/2018 | Gelonese | G09G 5/003 |
| 2018/0063627 | A1 | 3/2018 | Kubba et al. | |
| 2019/0373355 | A1 | 12/2019 | Lee et al. | |

OTHER PUBLICATIONS

International Search Report and Written Opinion for PCT Application No. PCT/US2019/033263 dated Sep. 3, 2019, 12 pages.

\* cited by examiner

*Primary Examiner* — Kile O Blair
(74) *Attorney, Agent, or Firm* — Hoffman Warnick LLC

(57) ABSTRACT

Various aspects include audio eyeglasses and methods for controlling audio eyeglasses. In some particular implementations, a method of controlling audio eyeglasses is disclosed. The method can include: detecting a reorient-and-hold gesture on the audio eyeglasses; initiating a timer in response to detecting the reorient-and-hold gesture; and in response to the timer exceeding a threshold period with the reorient-and-hold gesture maintained, powering off the audio eyeglasses.

20 Claims, 4 Drawing Sheets

AUDIO EYEGLASSES WITH GESTURE CONTROL

TECHNICAL FIELD

This disclosure generally relates to audio eyeglasses. More particularly, the disclosure relates to gesture-based power control in audio eyeglasses.

BACKGROUND

Wearable audio devices, such as off-ear headphones, produce sound using an electro-acoustic transducer that is spaced from the user's ear. These wearable audio devices may take various form factors. In some cases, design, computational and power constraints can limit the interface options for these wearable audio devices. Accordingly, it can be difficult to implement a complete set of interface commands without compromising one or more constraints.

SUMMARY

All examples and features mentioned below can be combined in any technically possible way.

Various implementations of the disclosure include audio eyeglasses, and approaches for controlling audio eyeglasses.

In some particular aspects, a computer-implemented method of controlling audio glasses includes: detecting a reorient-and-hold gesture on the audio glasses; initiating a timer in response to detecting the reorient-and-hold gesture; and in response to the timer exceeding a threshold period with the reorient-and-hold gesture maintained, powering off the audio glasses.

In other particular aspects, audio eyeglasses include: an electro-acoustic transducer including a sound-radiating surface for providing an audio output; an inertial measurement unit (IMU); a power source connected to the electro-acoustic transducer and the IMU; and a controller connected to the electro-acoustic transducer, the IMU and the power source, the controller configured to: detect a reorient-and-hold gesture on the audio eyeglasses; initiate a timer in response to detecting the reorient-and-hold gesture; and in response to the timer exceeding a threshold period with the reorient-and-hold gesture maintained, powering off the audio eyeglasses.

In certain implementations, the threshold period is equal to approximately 1-3 seconds.

In particular aspects, detecting the reorient-and-hold gesture includes receiving a position indication from an inertial measurement unit (IMU) on the audio eyeglasses that the audio eyeglasses have been reoriented. In some cases, the reoriented position includes a range of approximately 0-15 degrees relative to a ground surface or greater than approximately 45-90 degrees relative to an immediately preceding measured orientation. In certain aspects, the timer is initiated in response to receiving the position indication from the IMU that the audio eyeglasses have been reoriented. In particular implementations, the timer includes a clock timer coupled with the IMU.

In some aspects, the audio eyeglasses are powered on prior to detecting the reorient-and-hold gesture.

In particular cases, the audio eyeglasses include a single tactile interface, and powering off the audio eyeglasses is performed only by maintaining the reorient-and-hold gesture for a period exceeding the threshold period. In certain implementations, the method further includes, when the audio eyeglasses are powered off: detecting a command at the single tactile interface; and powering on the audio eyeglasses in response to detecting the command. In particular aspects, the single tactile interface includes an actuatable button or a capacitive touch interface.

In certain configurations, the computer-implemented method of controlling the audio glasses further includes placing the audio eyeglasses in an intermediate power state prior to powering off the audio eyeglasses, where the intermediate power state is initiated in response to the reorient-and-hold gesture being maintained for an intermediate threshold period that is shorter than the threshold period for powering off the audio eyeglasses.

In some cases, the audio eyeglasses further include a frame having a lens region and a pair of arms extending from the lens region for resting on the head of a user, the frame containing the electro-acoustic transducer, the IMU, the power source and the controller.

In certain implementations, detecting the reorient-and-hold gesture includes receiving a position indication from the inertial measurement unit (IMU) that the audio eyeglasses have been reoriented, and powering off the audio eyeglasses includes disconnecting a power connection between the power source and the electro-acoustic transducer. In particular aspects, the timer is initiated in response to receiving the position indication from the IMU that the audio eyeglasses have been reoriented.

In some cases, the audio eyeglasses further include a single tactile interface connected with the controller, where powering off the audio eyeglasses is performed only by maintaining the reorient-and-hold gesture for a period exceeding the threshold period. In certain aspects, the controller is further configured, when the audio eyeglasses are powered off, to: detect a command at the single tactile interface; and power on the audio eyeglasses in response to detecting the command, where the single tactile interface includes an actuatable button or a capacitive touch interface.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
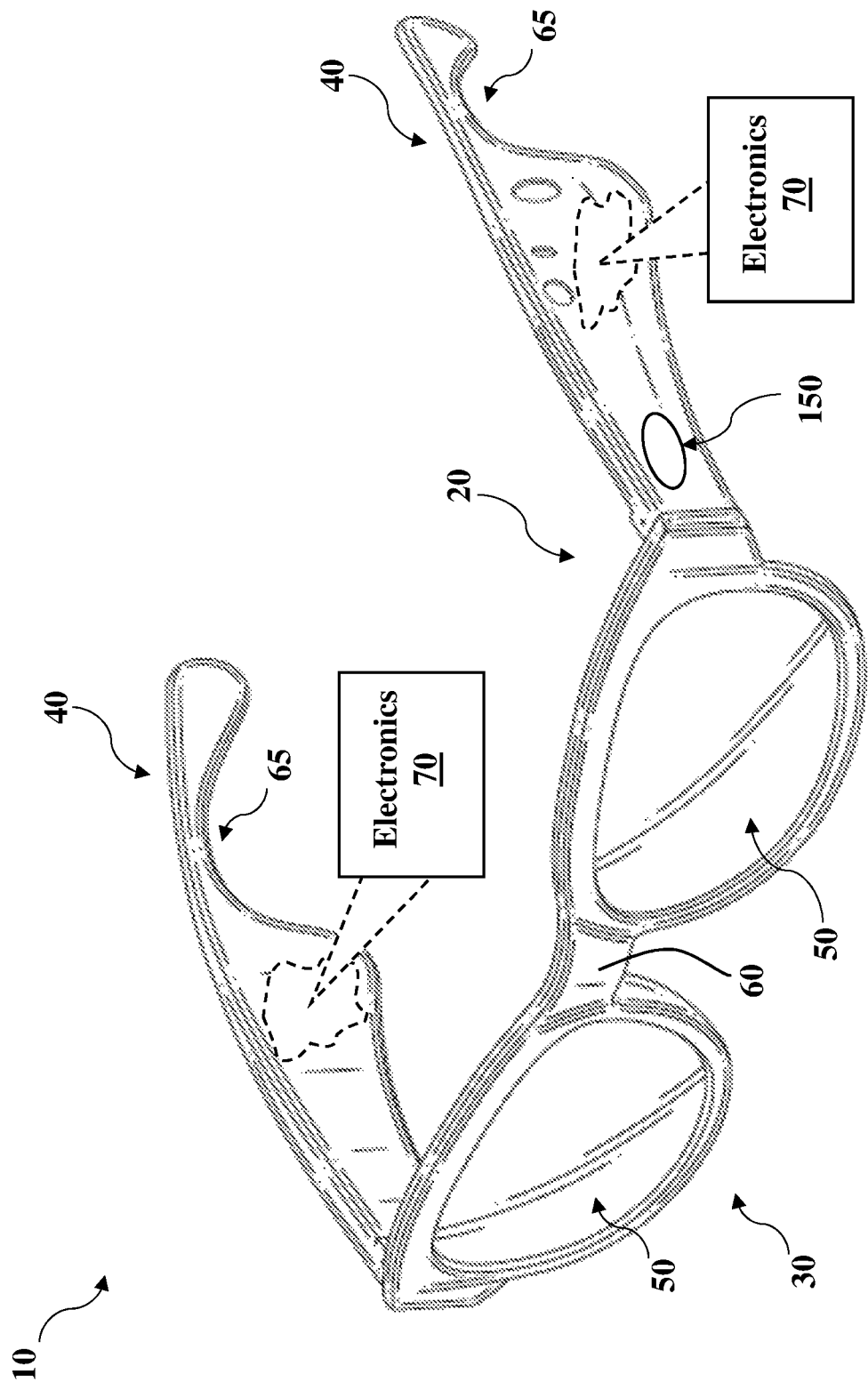
FIG. 1 shows a schematic depiction of audio eyeglasses according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to audio eyeglasses with gesture-based control.

More particularly, aspects of the disclosure relate to powering off audio eyeglasses using a reorient-and-hold gesture.

Commonly labeled components in the FIGURES are considered to be substantially equivalent components for the purposes of illustration, and redundant discussion of those components is omitted for clarity.

Aspects and implementations disclosed herein may be applicable to a wide variety of speaker systems, such as wearable audio devices in various form factors, such as watches, eyeglasses, neck-worn speakers, shoulder-worn speakers, body-worn speakers, etc. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as eyeglasses or other head-mounted audio devices. It should be noted that although specific implementations of speaker systems primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to speaker systems that either do or do not support two-way communications, and either do or do not support active noise reduction (ANR). For speaker systems that do support either two-way communications or ANR, it is intended that what is disclosed and claimed herein is applicable to a speaker system incorporating one or more microphones disposed on a portion of the speaker system that remains outside an ear when in use (e.g., feedforward microphones), on a portion that is inserted into a portion of an ear when in use (e.g., feedback microphones), or disposed on both of such portions. Still other implementations of speaker systems to which what is disclosed and what is claimed herein is applicable will be apparent to those skilled in the art.

As noted herein, off-ear headphones produce sound using an acoustic driver that is spaced (or, separated) from the ear of the user while in use. Audio eyeglasses (also referred to as eyeglass headphones) can include one or more dipole loudspeakers built into the eyeglass frame. Dipole loudspeakers produce out-of-phase sound from opposite sides of the loudspeaker's electro-acoustic transducer. The sound can be emitted from openings or vents in the eyeglass frame. If one vent is close to an ear and the other vent is farther from the ear, quality sound can be delivered to the ear with minimal spillage. Examples of off-ear headphones with dipole loudspeakers are disclosed in U.S. Pat. No. 9,794,676 and U.S. patent application Ser. No. 15/375,119, both of which are herein incorporated by reference in their entireties. Additional aspects of off-ear headphones are described in U.S. patent application Ser. No. 15/884,924, which is herein also incorporated by reference in its entirety. Additionally, designs of particular off-ear headphones are included in U.S. Design patent application No. 29/639,191, which is herein also incorporated by reference in its entirety.

While described as audio eyeglasses, or eyeglass headphones herein, the wearable audio devices disclosed herein can include additional features and capabilities. That is, the audio eyeglasses described according to various implementations can include features found in one or more other wearable electronic devices, such as smart glasses, smart watches, etc. These audio eyeglasses can include additional hardware components, such as one or more cameras, location tracking devices, microphones, etc., and may be capable of voice recognition, visual recognition, and other smart device functions. The description of audio eyeglasses included herein is not intended to exclude these additional capabilities in such a device.

Various particular implementations include audio eyeglasses and approaches for controlling a power off command on the audio eyeglasses. In certain implementations, a user can power off the audio eyeglasses using a reorient-and-hold gesture. This reorient-and-hold power control configuration can simplify the interface commands on the audio eyeglasses, such that the user need not interact with an interface (e.g., button, capacitive touch, or other interface) to power off the audio eyeglasses. In certain implementations, the reorient-and-hold gesture includes reorienting the audio eyeglasses (e.g., relative to a ground plane, or relative to an upright position such as on a user's head) and maintaining the reoriented position for a time greater than a threshold period. A controller can power off the audio sunglasses in response to the reorient-and-hold gesture exceeding the threshold period. In particular implementations, the threshold period can span a number of seconds. In some cases, a user can power off the audio eyeglasses by placing the audio eyeglasses upside down on an approximately flat surface (e.g., a surface approximately parallel with the ground, within the reoriented position range).

FIG. 1 is a schematic depiction of audio eyeglasses 10 according to various implementations. As shown, the audio eyeglasses 10 can include a frame 20 having a lens region 30 and a pair of arms 40 extending from the lens region 30. As with conventional eyeglasses, the lens region 30 and arms 40 are designed for resting on the head of a user. The lens region 30 can include a set of lenses 50, which can include prescription, non-prescription and/or light-filtering lenses, as well as a bridge 60 (which may include padding) for resting on the user's nose. Arms 40 can include a contour 65 for resting on the user's respective ears. Contained within the frame 20 (or substantially contained, such that a component can extend beyond the boundary of the frame) are electronics 70 and other components for controlling the audio eyeglasses 10 according to particular implementations. In some cases, separate, or duplicate sets of electronics 70 are contained in portions of the frame, e.g., each of the respective arms 40 in the frame 20. However, certain components described herein can also be present in singular form.

Figure 2:
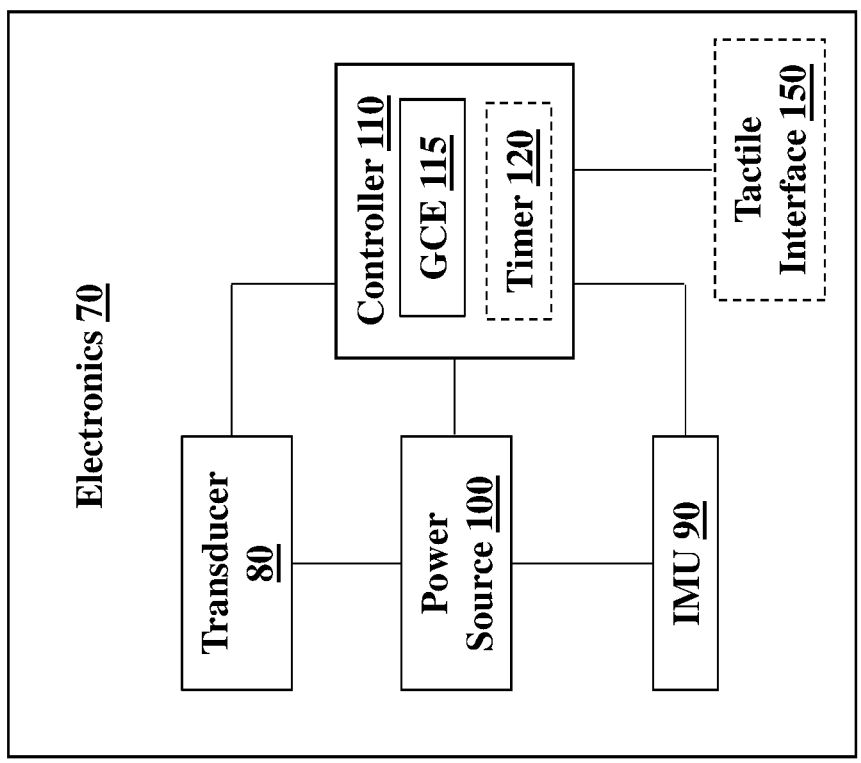
FIG. 2 is a schematic depiction of select electronics substantially contained in the audio eyeglasses of FIG. 1.

FIG. 2 shows a schematic depiction of the electronics 70 contained within the frame 20 (FIG. 1). It is understood that one or more of the components in electronics 70 may be implemented as hardware and/or software, and that such components may be connected by any conventional means (e.g., hard-wired and/or wireless connection). It is further understood that any component described as connected or coupled to another component in audio eyeglasses 10 or other systems disclosed according to implementations may communicate using any conventional hard-wired connection and/or additional communications protocols. In some cases, communications protocol(s) can include a Wi-Fi protocol using a wireless local area network (LAN), a communication protocol such as IEEE 802.11b/g a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio eyeglasses 10 are configured to communicate using one or more conventional wireless transceivers.

As shown in FIG. 2, electronics 70 contained within the frame 20 (FIG. 1) can include a transducer 80, an inertial measurement unit (IMU) 90, and a power source 100. In various implementations, the power source 100 is connected to the transducer 80, and can additionally be connected to the IMU 90. Each of the transducer 80, IMU 90 and power source 100 are connected with a controller 110, which is configured to perform control functions according to various implementations described herein. Electronics 70 can include other components not specifically depicted herein, such as communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. It is understood that these components or functional equivalents of these components can be connected with, or form part of, the controller 110.

The transducer 80 can include at least one electroacoustic transducer for producing an acoustic output proximate the ears of a user. In some particular cases, at least two electroacoustic transducers 80 are positioned proximate (but physically separated from) the ears of the user (e.g., one transducer 80 proximate each ear). However, it is understood that in other cases, transducers 80 can be positioned extending from arms 40 such that they physically contact the ears of the user. In certain implementations, each transducer 80 can include a dipole loudspeaker with an acoustic driver or radiator that emits front-side acoustic radiation from its front side, and emits rear-side acoustic radiation to its rear side. The dipole loudspeaker can be built into the frame 20 of the audio eyeglasses 10 (FIG. 1). A housing can direct the front-side acoustic radiation and a housing can direct the rear-side acoustic radiation. A plurality of sound-conducting vents (openings) in the housing allow sound to leave the housing. Openings in the eyeglass frame 20 can be aligned with these vents, so that the sound also leaves the frame 20. In these cases, a distance between the sound-conducting openings defines an effective length of an acoustic dipole of the loudspeaker. The effective length may be considered to be the distance between the two openings that contribute most to the emitted radiation at any particular frequency. The housing and its openings can be constructed and arranged such that the effective dipole length is frequency dependent. In certain cases, the transducer 80 (e.g., loudspeaker dipole transducer) is able to achieve a greater ratio of sound pressure delivered to the ear to spilled sound, as compared to an off-ear headphone not having this feature.

The IMU 90 can include a microelectromechanical system (MEMS) device that combines a multi-axis accelerometer, gyroscope, and/or magnetometer. It is understood that additional or alternative sensors may perform functions of the IMU 90, e.g., an optical-based tracking system, accelerometer, magnetometer, gyroscope or radar for detecting movement as described herein. The IMU 90 can be configured to detect changes in the physical location of the audio eyeglasses 10, and provide updated sensor data to the controller 110 in order to indicate a change in the location of the audio eyeglasses 10. IMU 90 can also be configured to detect the orientation of the audio eyeglasses 10, e.g., a direction of the audio eyeglasses 10, or a change in the orientation of audio eyeglasses 10 such as a turning, flipping or rotating of a certain number of degrees. In these examples, the IMU 90 may be particularly useful in detecting changes in orientation. However, it is understood that the electronics 70 could also include one or more optical or visual detection systems located at the audio eyeglasses 10 or another connected device configured to detect the orientation of the audio eyeglasses 10. In any case, the IMU 90 (and/or additional sensors) can provide sensor data to the controller 110 about the location and/or orientation of the audio eyeglasses 10.

The power source 100 to the transducer 80 can be provided locally (e.g., with a battery in each of the temple regions of the frame 20), or a single battery can transfer power via wiring (not shown) that passes through the frame 20 or is otherwise transferred from one temple to the other. The power source 100 can be used to control operation of the transducer 80, according to various implementations.

The controller 110 can include conventional hardware and/or software components for executing program instructions or code according to processes described herein. For example, controller 110 may include one or more processors, memory, communications pathways between components, and/or one or more logic engines for executing program code. Controller 110 can be coupled with other components in the electronics 70 via any conventional wireless and/or hardwired connection which allows controller 110 to send/receive signals to/from those components and control operation thereof.

Controller 110 can include a gesture control engine (GCE 115, FIG. 2) for controlling the connection between the transducer 80 and power source 100 in response to receiving sensor data from the IMU 90. That is, controller 110 can include logic (e.g., gesture control engine 115) for processing sensor data received from the IMU 90 in order to control a power state of the transducer 80, and thereby control output of the transducer 80 based upon that sensor data. In some cases, the controller 110 is configured to control a power off function while the audio eyeglasses 10 are powered on, however, in additional implementations, the controller 110 can control a power on function while the audio eyeglasses 10 are powered off.

In particular configurations, the controller 110 is configured to: a) detect a reorient-and-hold gesture on the audio eyeglasses 10; b) initiate a timer 120 in response to detecting the reorient-and-hold gesture; and c) in response to the timer 120 exceeding a threshold period with the reorient-and-hold gesture maintained, powering off the audio eyeglasses 10.

In various implementations, the timer 120 is contained within the controller 110, e.g., as a software and/or hardware component configured to track an elapsed period. However, in other implementations, the timer 120 is a separate component coupled with controller 110 and the IMU 90. In certain implementations, the timer 120 is constructed as logic in the controller (e.g., in a gesture control engine) 110. In other implementations, the timer 120 includes a clock timer connected with the IMU 90 and either integrated into the controller 110 or connected with the controller 110.

Figure 3:
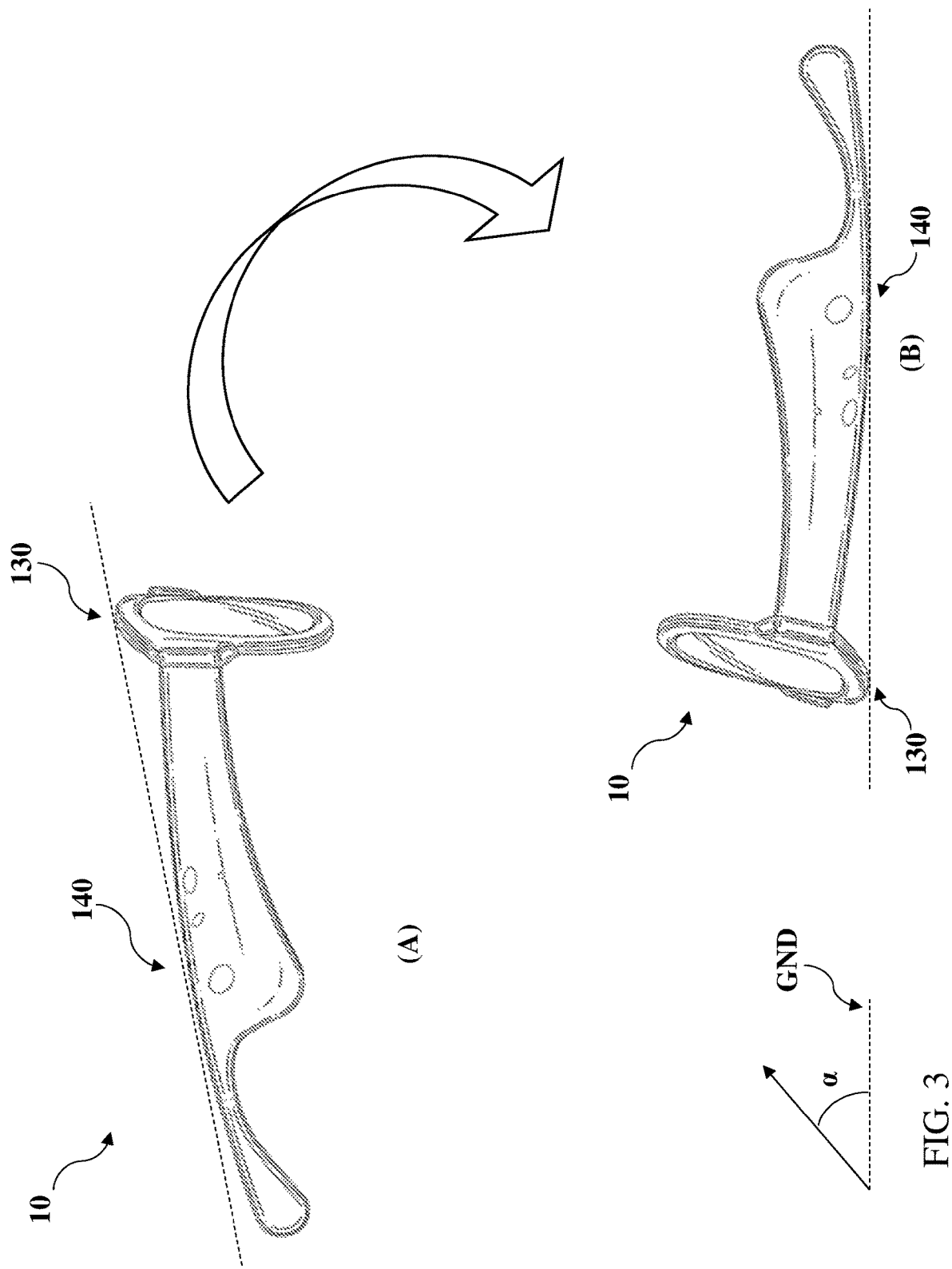
FIG. 3 illustrates an example gesture-based command for controlling power at audio eyeglasses according to various implementations.
Figure 4:
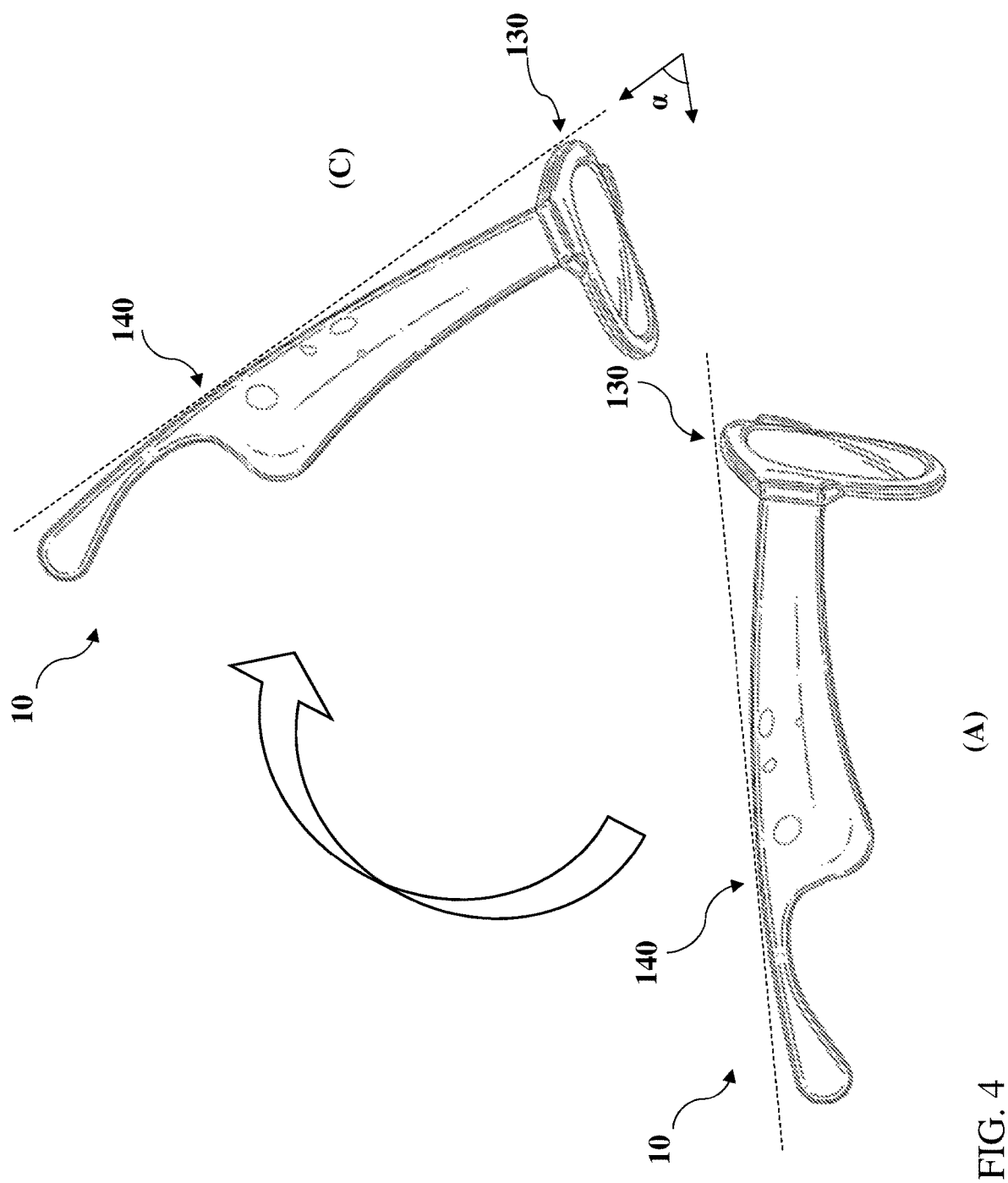
FIG. 4 illustrates an additional example gesture-based command for controlling power at audio eyeglasses according to various implementations.

Controller 110 is configured to detect the reorient-and-hold gesture on the audio eyeglasses 10 by receiving a position indication (e.g., position indication signal) from the IMU 90 that indicates the audio eyeglasses 10 have been reoriented. FIG. 3 schematically depicts audio eyeglasses 10 moving from an upright position (A), such as on a user's head, to a reoriented position (B), where the reoriented position (B) is an approximately inverted position. IMU 90 can detect movement (and position) of the audio eyeglasses 10 during the transition from the upright position (A) to the reoriented position (B). FIG. 4 schematically depicts audio eyeglasses 10 moving from an upright position (A) to a distinct reoriented position (C), where the reoriented position (C) differs from the upright position (A) by greater than a threshold angle (e.g., relative change of greater than approximately 15 degrees, as measured from a reference such as the ground, or greater than approximately 45-90 degrees relative to an immediately preceding measured orientation of the audio eyeglasses 10 prior to the gesture). It is understood that any reorientation measurable by the IMU 90 and greater than a threshold reorientation can be used to trigger the controller 110 (and timer 120) to begin timing for power off. Relative movement in the x, y and/or z axis of greater than the threshold reorientation can be used to trigger the power off mechanism described herein.

IMU 90 can be configured to send position indication signals to controller 110 on a continuous basis, or in particular cases, in response to movement detected by the multi-axis accelerometer, gyroscope, and/or magnetometer in the IMU 90. According to some implementations, IMU 90 detects both relative movement and absolute position of the audio eyeglasses 10, such that the user need only trigger a threshold movement to initiate the timer 120 for controlling the power state at the audio eyeglasses 10. As described herein, distinct thresholds can be defined for distinct relative and absolute position(s) in order to control the power state of the audio eyeglasses 10.

As used herein, a reoriented position can be defined relative to a ground surface, an approximately flat surface, or a position of the audio eyeglasses 10 prior to reorientation. It is envisioned that the ground or flat surface is defined relative to a surface upon which the user of the audio eyeglasses 10 is sitting or standing, such that the audio eyeglasses 10 can detect relative position to respond to user commands. For example, where the user is in an ascending or descending airplane, the reoriented position can be defined relative to the floor of the airplane or the tabletop surface of a tray table. In most scenarios, a user is likely to be standing on a ground or other approximately parallel surface, and as such, the reoriented position can be measured relative to the ground surface or the position of the audio eyeglasses 10 prior to initiating the gesture.

In certain implementations, the reoriented position is an approximately inverted position, defined as a range of approximately 0-15 degrees (positive or negative) relative to a ground surface. In these implementations, the user need not reorient the audio eyeglasses 10 to exactly the zero degree (or parallel with ground) position in order to trigger the reorient-and-hold gesture). As shown in FIG. 3, the reoriented position (e.g., an inverted position) as described herein can be measured by the approximate angle (a) of a line contacting the top surface 130 of the lens region 30 and the top surface 140 of the arms 40 the audio eyeglasses 10. That is, the zero degree (or completely reoriented) position can be defined such that the line contacting the top surface of the lens region 30 and the arms 40 is parallel with the ground or flat surface (GND). The term "approximately" as used with respect to measured angles can allot for a nominal variation from absolute values, e.g., of approximately 3 degrees or less.

In additional implementations, as shown in FIG. 4, the reoriented position can be defined as any movement from one position to another of greater than a reorientation threshold, e.g., greater than approximately 45 degrees in any direction, or 90 degrees in any direction, as measured by the line contacting the top surface 130 of the lens region 30 and the top surface 140 of the arms 40. Where IMU 90 sends a signal to the controller 110 indicating reorientation of greater than approximately 45 degrees, or greater than approximately 90 degrees, the controller 110 can be configured to initiate timer 120 to begin clocking that reorient-and-hold gesture. As with the example of an inverted position (e.g., +/−approximately 15 degrees or less from the horizontal plane), the controller 110 is configured to power off the audio eyeglasses 10 in response to the timer 120 exceeding the threshold period (e.g., 1-3 seconds).

In certain implementations, distinct threshold periods are defined for distinct reorientation scenarios. For example, in the case of an invert-and-hold gesture, where the IMU 90 indicates that the audio eyeglasses 10 have been reoriented to an inverted position (+/−approximately 15 degrees from horizontal plane, illustrated in the example of FIG. 3), the threshold period can be shorter than in the case of a reorient-and-hold gesture that is not within the inverted position range (e.g., +/−approximately 45 degrees or +/−approximately 90 degrees from the immediately preceding registered position/orientation signal from the IMU 90, illustrated In the example of FIG. 4). In these scenarios, the broader reorient-and-hold timing threshold could be a longer period, such as 3-5 seconds. This variation can limit unintentional power-off events on the audio eyeglasses 10 where a user simply reorients the audio eyeglasses 10 momentarily, such as to adjust a position of the audio eyeglasses 10, clean the lenses of the audio eyeglasses 10, etc.

As described herein, controller 110 is configured (i.e., programmed) to initiate the timer 120 in response to detecting the reorient-and-hold gesture (e.g., movement greater than a threshold). That is, in response to receiving the position indication from the IMU 90 that the audio eyeglasses 10 have been reoriented (e.g., by greater than a threshold such as greater than approximately 45 degrees or greater than approximately 90 degrees in any direction), controller 110 initiates timer 120 to begin counting for a power-off event. As noted herein, controller 110 can vary the timer 120 based upon the degree of movement of the audio eyeglasses 10 from an immediately preceding position (as detected by IMU 90), or the absolute position of the audio eyeglasses 10 (e.g., relative to the inverted position) in order to control power-off events for different movement scenarios.

In some additional implementations, the controller 110 is configured to provide a warning that the audio eyeglasses 10 are powering off. For example, in the case of reorientation of the audio eyeglasses 10 (e.g., movement of greater than approximately 45 degrees, or greater than approximately 90 degrees in any direction, without arriving in the inverted position), the controller 110 can initiate a warning to the user that the audio eyeglasses 10 are powering off. This may be particularly beneficial when the audio eyeglasses 10 remain on the head of the user when the reorientation occurs. In some cases, the warning can include an audible warning, such as a message (via transducer 80) that the audio eyeglasses 10 are powering down (e.g., "powering down"). In additional implementations, the message can prompt the user to prevent the power off event. In some cases, the message can prompt a response from the user, e.g., a tactile or other motion-based cue detectable by the tactile interface 150 and/or the IMU 90 (e.g., "powering down; tap twice or shake head to avoid powering down") or a voice cue detectable by a microphone in electronics 70 (e.g., "say 'continue' or 'play' to avoid powering down"). In certain cases, the warning can include a vibration-based warning, such as a vibration of the audio eyeglasses 10 (which may be controlled using IMU 90 or another accelerometer/gyroscope in electronics 70). The controller 110 can be configured to stop the power off event in response to receiving a cue from the user.

In the case that the audio eyeglasses 10 continue to move, such that the user is fidgeting with the audio eyeglasses, or simply looking around the surrounding area, the IMU 90 sends corresponding updated position information to the controller 110, which terminates the timer 120 or resets the timer 120 based upon the updated position information if the threshold period has not elapsed. In response to the timer 120 (clock) exceeding the threshold period with the IMU 90 signals indicating that the reorient-and-hold gesture at the audio eyeglasses 10 is maintained, the controller 110 powers off the audio eyeglasses 10. In various implementations, powering off the audio eyeglasses 10 includes disconnecting a power connection between the power source 100 and the electro-acoustic transducer 80.

Returning to FIG. 1 (and with reference to FIG. 2), in certain implementations, the audio eyeglasses 10 have only a single tactile interface 150, which is connected with the controller 110. In these cases, the tactile interface 150 can be reserved for functions such as audio selection, powering on the audio eyeglasses or engaging a voice control function. However, in these particular implementations, the (single) tactile interface 150 does not permit control of powering off the audio eyeglasses 10. In these implementations, powering off the audio eyeglasses 10 is performed only by maintaining the reorient-and-hold gesture for a period exceeding the threshold period. This configuration can reduce interface space (e.g., physical space, as well as computational resources and hardware component footprint) which may otherwise be dedicated to power control.

In some additional implementations, such as those including the tactile interface 150, when the audio eyeglasses 10 are powered off, the controller 110 is configured to detect a command (command signal) at the tactile interface 150 (e.g., a touch command, swipe command, press-and-hold command, squeeze command) and power on the audio eyeglasses 10 in response to detecting that command. That is, the controller 110 can receive the command signal from the tactile interface 150, and instruct power source 100 to initiate power to the transducer 80, providing the audio output at transducer 80.

In certain cases, the tactile interface 150 includes an actuatable button or a capacitive touch interface. In some additional implementations, the single tactile interface 150 includes a compressible interface, which can allow a user to squeeze one or more sections of the audio eyeglasses 10 (e.g., arms 40) to initiate a user interface command. The tactile interface 150 shown in FIG. 1 is merely intended to illustrate one example of a tactile interface (e.g., a button or capacitive touch interface). It is understood that interface functions can be integrated into the frame of the audio eyeglasses 10 such that the interface may not be visible to the naked eye.

As noted herein, the audio eyeglasses 10 can be powered on using one or more commands and/or interfaces. In some implementations, the audio eyeglasses 10 can be powered on while in an inverted position, e.g., in position (B) in FIG. 3 or in a position that deviates from the upright position (e.g., upright position (A) in FIG. 3) by greater than a threshold orientation. In these scenarios, controller 110 will not initiate timer 120 until receiving a signal from the IMU 90 indicating that the audio eyeglasses 10 have been reoriented after the power-on event. That is, the audio eyeglasses 10 can be powered on in an inverted or otherwise not upright position, but the gesture-based power off mechanism in controller 110 will not be triggered until the audio eyeglasses 10 are reoriented from that position.

In various implementations, the audio eyeglasses 10 are likely to be reoriented and held in a position that triggers one or more functions as described herein. For example, a user may remove the audio eyeglasses 10 from her head, reorient (or flip) the audio eyeglasses 10 outward (e.g., similar to tipping a hat), and hold that reoriented position for a period. As described herein, this gesture can be used to power off the audio eyeglasses 10. In other implementations, the audio eyeglasses 10 can be placed on an approximately flat surface (e.g., a tabletop, counter, seat or bed) by a user as conventional eyeglasses may be placed. In additional implementations, the user can tilt the audio eyeglasses 10 sideways (e.g., by greater than approximately 45 degrees or approximately 90 degrees) to power off the audio eyeglasses 10 in order to turn attention to another sound (e.g., a ringing phone, a siren, or the voice of a nearby person). In still further implementations, the user can reposition the audio eyeglasses 10 on her head, e.g., by sliding the glasses upward to rest on the crown of her head, tilting the audio eyeglasses by greater than the threshold angle (e.g., approximately 45 degrees or 90 degrees). The audio eyeglasses 10 can be configured (e.g., via controller 110 and IMU 90) to detect its orientation and perform certain functions as described herein, e.g., power off after a threshold period.

In still additional implementations, the audio eyeglasses 10 can be configured to switch into an intermediate power state (or a plurality of successive intermediate power states) prior to completely powering off. For example, prior to powering off the audio eyeglasses 10 as described herein, the controller 110 can be configured to place the audio eyeglasses 10 in an intermediate power state (e.g., a sleep mode or other dormant mode) where one or more components in the electronics 70 is shut down prior to completely powering off the audio eyeglasses 10. In various implementations, the intermediate power state is initiated in response to the reorient-and-hold gesture being maintained for an intermediate threshold period that is shorter than the threshold period for powering off the audio eyeglasses 10. In certain cases, the intermediate threshold period is concurrent with the threshold period for powering off the audio eyeglasses 10, however, in other cases, the threshold period for powering off the audio eyeglasses 10 does not initiate (e.g., via timer 120) until the intermediate threshold period has concluded. In one particular example, in response to a reorient-and-hold gesture by the user, the audio eyeglasses 10 can initiate an intermediate power state after waiting for the intermediate threshold period (e.g., a few seconds or more) and after conclusion of the intermediate threshold period, can initiate timer 120 to begin clocking the threshold period (e.g., a few additional seconds or more) for powering off the audio eyeglasses 10.

In some cases, in response to the reorient-and-hold gesture as described herein, the audio eyeglasses 10 can power off a communications component (e.g., a Bluetooth communications component) in the intermediate power state without completely powering off the audio eyeglasses 10. In these implementations, the user can reorient the audio eyeglasses 10 or provide another command (e.g., voice command to a microphone or tactile command to tactile interface 150) to wake the audio eyeglasses 10 and avoid a power off event.

In other cases, in response to the reorient-and-hold gesture, the audio eyeglasses 10 can power off the transducer 80 in an intermediate power state without completely powering off the audio eyeglasses 10. In these implementations, audio playback at the audio eyeglasses 10 will stop without completely powering off the audio eyeglasses 10. In these implementations, the user can reorient the audio eyeglasses 10 or provide another command (e.g., voice command to a microphone or tactile command to tactile interface 150) to wake the audio eyeglasses 10 and avoid a power off event. In certain aspects, when the audio eyeglasses 10 wake from the intermediate power state, audio playback at the transducer 80 can be restarted (e.g., from a point at which the playback terminated due to the switch to the intermediate power state).

In certain aspects, the intermediate power state (e.g., sleep or standby mode) can last for a period of seconds, e.g., 5-10 seconds. However, in other cases, the intermediate power state can last for a period of minutes, e.g., 1-3 minutes. This intermediate power state can be clocked using timer 120, and may run consecutively with the timer mechanism for the power off event, or may run concurrently with the timer mechanism for the power off event.

In still further implementations, the audio eyeglasses 10 can be configured to change operating modes in response to the reorient-and-hold gesture. For example, the audio eyeglasses can be configured to switch to an out-loud operating mode in response to detecting a reorient- and hold gesture (e.g., an inverted position held for a threshold period). In these implementations, the controller 110 can minimize or turn off a spillage reduction function at the transducer 80 to permit out loud playback. In certain implementations, this out-loud operating mode can be controlled by one or more additional commands, either prior to reorienting the audio eyeglasses 10 or after reorienting the audio eyeglasses. For example, a user can initiate the out-loud operating mode by providing a command to the controller 110 (e.g., a tactile command and/or voice command) prior to reorienting the audio eyeglasses, such that the controller 110 receives the out-loud operating mode command followed by detection of the reorient-and-hold gesture and minimizes or turns off the spillage reduction function at transducer 80 to play audio in an out loud mode. In another implementation, the user can first perform the reorient-and-hold gesture (e.g., by inverting the audio eyeglasses 10 and placing on a surface), and subsequently provide an out-loud operating mode command (e.g., tactile and/or voice command) to initiate the out-loud operating mode. In these cases, the audio eyeglasses 10 can be configured to receive the out-loud operating mode command during the power off countdown or during an intermediate state countdown.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. A computer-implemented method of controlling audio eyeglasses, the method comprising:
   detecting a reorient-and-hold gesture on the audio eyeglasses, wherein detecting the reorient-and-hold gesture comprises detecting that a reoriented position of the audio eyeglasses is greater than: a) a first threshold angle from a reference orientation, wherein the reference orientation comprises an upright position measured relative to a ground surface or b) a second, distinct threshold angle from an immediately preceding measured orientation of the audio eyeglasses, wherein the first threshold angle is less than the second, distinct threshold angle;
   initiating a timer in response to detecting the reorient-and-hold gesture; and
   in response to the timer exceeding a threshold period with the reorient-and-hold gesture maintained, powering off the audio eyeglasses.

2. The computer-implemented method of claim 1, wherein the threshold period is equal to approximately 1-3 seconds.

3. The computer-implemented method of claim 1, wherein detecting the reorient-and-hold gesture comprises receiving a position indication from an inertial measurement unit (IMU) on the audio eyeglasses that the audio eyeglasses have been reoriented in a reoriented position, and the reoriented position comprises a range of approximately 0-15 degrees relative to the ground surface or greater than approximately 45-90 degrees relative to the immediately preceding measured orientation.

4. The computer-implemented method of claim 3, wherein the timer is initiated in response to receiving the position indication from the IMU that the audio eyeglasses have been reoriented in the reoriented position, and wherein the audio eyeglasses are powered on prior to detecting the reorient-and-hold gesture.

5. The computer-implemented method of claim 1, wherein the audio eyeglasses comprise a single tactile interface, wherein powering off the audio eyeglasses is performed only by maintaining the reorient-and-hold gesture for a period exceeding the threshold period, and
   wherein the method further comprises, when the audio eyeglasses are powered off:
   detecting a command at the single tactile interface; and
   powering on the audio eyeglasses in response to detecting the command.

6. The computer-implemented method of claim 1, further comprising placing the audio eyeglasses in an intermediate power state prior to powering off the audio eyeglasses, wherein the intermediate power state is initiated in response to the reorient-and-hold gesture being maintained for an intermediate threshold period that is shorter than the threshold period for powering off the audio eyeglasses.

7. The computer-implemented method of claim 1, wherein the timer comprises distinct timers comprising a first timer for detecting the change in position of the audio eyeglasses by greater than the first threshold angle and a second timer for detecting the change in position of the audio eyeglasses by greater than the second, distinct threshold angle.

8. The computer-implemented method of claim 7, wherein the first threshold angle indicates that the audio eyeglasses are in an inverted position range and the second threshold angle indicates that the audio eyeglasses are not within the inverted position range, and wherein the first timer is shorter than the second timer.

9. The computer-implemented method of claim 8, wherein the inverted position range is defined as approximately plus-or-minus 15 degrees from a horizontal plane.

10. Audio eyeglasses comprising:
    an electro-acoustic transducer comprising a sound-radiating surface for providing an audio output;
    an inertial measurement unit (IMU);
    a power source connected to the electro-acoustic transducer and the IMU; and
    a controller connected to the electro-acoustic transducer, the IMU and the power source, the controller configured to:
    detect a reorient-and-hold gesture on the audio eyeglasses, wherein detecting the reorient-and-hold gesture comprises detecting that a reoriented position of the audio eyeglasses is greater than: a) a first threshold angle from a reference orientation, wherein the reference orientation comprises an upright position measured relative to a ground surface or b) a second, distinct threshold angle from an immediately preceding measured orientation of the audio eyeglasses, wherein the first threshold angle is less than the second, distinct threshold angle;
    initiate a timer in response to detecting the reorient-and-hold gesture; and
    in response to the timer exceeding a threshold period with the reorient-and-hold gesture maintained, powering off the audio eyeglasses.

11. The audio eyeglasses of claim 10, further comprising a frame comprising a lens region and a pair of arms extending from the lens region for resting on the head of a user, the frame containing the electro-acoustic transducer, the IMU, the power source and the controller.

12. The audio eyeglasses of claim 10, wherein the threshold period is equal to approximately 1-3 seconds.

13. The audio eyeglasses of claim 10, wherein detecting the reorientation of the audio eyeglasses and the reorient-and-hold gesture comprises receiving a position indication from the inertial measurement unit (IMU) that the audio eyeglasses have been reoriented, and wherein powering off the audio eyeglasses comprises disconnecting a power connection between the power source and the electro-acoustic transducer.

14. The audio eyeglasses of claim 13, wherein the reoriented position comprises a range of approximately 0-15 degrees relative to the ground surface or approximately greater than approximately 45-90 degrees relative to the immediately preceding measured orientation.

15. The audio eyeglasses of claim 13, wherein the timer is initiated in response to receiving the position indication from the IMU that the audio eyeglasses have been reoriented, and the audio eyeglasses are powered on prior to detecting the reorient-and-hold gesture.

16. The audio eyeglasses of claim 10, further comprising a single tactile interface connected with the controller, wherein powering off the audio eyeglasses is performed only by maintaining the reorient-and-hold gesture for a period exceeding the threshold period.

17. The audio eyeglasses of claim 16, wherein the controller is further configured, when the audio eyeglasses are powered off, to:
    detect a command at the single tactile interface; and
    power on the audio eyeglasses in response to detecting the command,
    wherein the single tactile interface comprises an actuatable button or a capacitive touch interface.

18. The audio eyeglasses of claim 10, wherein the timer comprises distinct timers comprising a first timer for detecting the change in position of the audio eyeglasses by greater than the first threshold angle and a second timer for detecting the change in position of the audio eyeglasses by greater than the second, distinct threshold angle.

19. The audio eyeglasses of claim 18, wherein the first threshold angle indicates that the audio eyeglasses are in an inverted position range and the second threshold angle indicates that the audio eyeglasses are not within the inverted position range, and wherein the first timer is shorter than the second timer.

20. The audio eyeglasses of claim 19, wherein the inverted position range is defined as approximately plus-or-minus 15 degrees from a horizontal plane.

* * * * *